(12) United States Patent
Barrett et al.

(10) Patent No.: US 12,375,432 B2
(45) Date of Patent: **\*Jul. 29, 2025**

(54) CHAT MANAGEMENT SYSTEM

(71) Applicant: EXPENSIFY, INC., San Francisco, CA (US)

(72) Inventors: David M. Barrett, San Francisco, CA (US); Melissa Aaron, San Francisco, CA (US)

(73) Assignee: Expensify, Inc., San Francisco, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/642,403

(22) Filed: Apr. 22, 2024

(65) Prior Publication Data

US 2024/0275742 A1 Aug. 15, 2024

Related U.S. Application Data

(63) Continuation of application No. 17/721,190, filed on Apr. 14, 2022, now Pat. No. 11,997,055, which is a continuation of application No. 15/415,856, filed on Jan. 25, 2017, now Pat. No. 11,516,153.

(60) Provisional application No. 62/286,834, filed on Jan. 25, 2016.

(51) Int. Cl.
*H04L 51/02* (2022.01)
*H04L 51/046* (2022.01)

(52) U.S. Cl.
CPC ............ *H04L 51/02* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 7,089,208 B1 | 8/2006 | Levchin | |
| 7,809,724 B2 * | 10/2010 | Roche | G06F 40/30 707/736 |
| 8,560,353 B2 | 10/2013 | Smith | |
| 8,762,272 B1 | 6/2014 | Cozens | |
| 8,769,417 B1 | 7/2014 | Robinson | |

(Continued)

FOREIGN PATENT DOCUMENTS

| | | |
|---|---|---|
| GB | 0621189.0 | 12/2006 |
| WO | WO-2007/064879 A2 | 6/2007 |

(Continued)

OTHER PUBLICATIONS

Du Preez et al. "An Intelligent Web-Based Voice Chat Bot." IEEE Eurocon 2009. pp. 386-391. IEEE. (Year: 2009).*

(Continued)

*Primary Examiner* — Jeffrey R Swearingen
(74) *Attorney, Agent, or Firm* — Mahamedi IP Law LLP

(57) ABSTRACT

A system receives a chat query based on a user interaction on a computing device of user. The system parses the chat query to identify one or more word patterns in the chat query, and determines a matching plug-in from the plug-in library based at least in part on the one or more word patterns in the chat query. The system utilizes the matching plug-in to access one or more resources and determine a chat response for the chat query, and transmit, over the one or more networks, the chat response to the computing device of the user.

20 Claims, 3 Drawing Sheets

(56) References Cited

U.S. PATENT DOCUMENTS

| | | |
|---|---|---|
| 9,043,407 B1 | 5/2015 | Gaulke |
| 9,245,296 B2 | 1/2016 | Nuggehalli |
| 9,275,418 B2 | 3/2016 | Johansen |
| 9,595,031 B1 | 3/2017 | Grassadonia |
| 9,773,232 B1 | 9/2017 | Grassadonia |
| 9,792,600 B1 | 10/2017 | Grassadonia |
| 9,892,400 B1 | 1/2018 | Grassadonia |
| 10,115,083 B1 | 10/2018 | Koeppel |
| 10,540,646 B2 | 1/2020 | Schlosser |
| 10,540,724 B2 | 1/2020 | Whitley |
| 10,552,808 B1 | 2/2020 | Grassadonia |
| 10,915,872 B1 | 2/2021 | Bickerstaff |
| 10,990,997 B1 | 4/2021 | Hayes |
| 11,321,560 B2 | 5/2022 | Jennings |
| 11,475,447 B2 | 10/2022 | Main |
| 11,514,421 B2 | 11/2022 | Grassadonia |
| 11,526,875 B1 | 12/2022 | Shetti |
| 11,663,655 B2 | 5/2023 | Benkreira |
| 2007/0294229 A1* | 12/2007 | Au .................. G06F 16/951 |
| 2008/0046347 A1 | 2/2008 | Smith |
| 2008/0172622 A1* | 7/2008 | Roche ............... G06F 16/25 |
| | | 715/762 |
| 2009/0281948 A1 | 11/2009 | Carlson |
| 2012/0221446 A1 | 8/2012 | Grigg |
| 2013/0204834 A1 | 8/2013 | Forsee, II |
| 2013/0311447 A1 | 11/2013 | Liensberger |
| 2014/0052633 A1 | 2/2014 | Gandhi |
| 2014/0081847 A1 | 3/2014 | King |
| 2014/0122618 A1 | 5/2014 | Duan |
| 2016/0006750 A1 | 1/2016 | Yang |
| 2016/0042420 A1 | 2/2016 | Purcell |
| 2016/0094506 A1 | 3/2016 | Harden |
| 2016/0099892 A1 | 4/2016 | Palakovich |
| 2017/0230312 A1 | 8/2017 | Barrett |
| 2018/0005215 A1 | 1/2018 | Delaney |
| 2018/0005216 A1 | 1/2018 | Delaney |
| 2019/0102813 A1 | 4/2019 | O'Neill |
| 2019/0312969 A1 | 10/2019 | Honoré |
| 2020/0090163 A1 | 3/2020 | Brown |
| 2020/0143373 A1 | 5/2020 | Chen |
| 2021/0201380 A1 | 7/2021 | Belcher |
| 2021/0406984 A1 | 12/2021 | Fredrich |
| 2022/0092583 A1 | 3/2022 | Ur |
| 2022/0180364 A1 | 6/2022 | Peled |
| 2022/0405776 A1 | 12/2022 | Tietzen |
| 2023/0025638 A1 | 1/2023 | Gandhi |
| 2023/0033328 A1 | 2/2023 | Pal |
| 2023/0385924 A1 | 11/2023 | Eidam |

FOREIGN PATENT DOCUMENTS

| | | |
|---|---|---|
| WO | WO-2012/116125 A1 | 8/2012 |
| WO | WO-2016/024183 A2 | 2/2016 |
| WO | WO-2016/068854 A1 | 5/2016 |
| WO | WO-2022/103623 A1 | 5/2022 |

OTHER PUBLICATIONS

International Search Report and The Written Opinion of The International Searching Authority mailed Apr. 19, 2023, for related PCT/US2022/045106 filed Sep. 28, 2022, 15 pages.

* cited by examiner

CHAT MANAGEMENT SYSTEM

RELATED APPLICATIONS

This application is a continuation of U.S. patent application Ser. No. 17/721,190, filed on Apr. 14, 2022, which is a continuation of U.S. patent application Ser. No. 15/415,856, filed on Jan. 25, 2017, now U.S. Pat. No. 11,516,153, issued on Nov. 29, 2022; which claims benefit of priority to Provisional U.S. Patent Application No. 62/286,834, filed Jan. 25, 2016; the aforementioned applications being hereby incorporated by reference in their entireties for all purposes.

BACKGROUND

Numerous types of search systems exist which utilize well-formulated queries. For example, a search engine typically receives a search query that is fully qualified, such that what remains to be computationally determined is the output.

DETAILED DESCRIPTION

Figure 1:
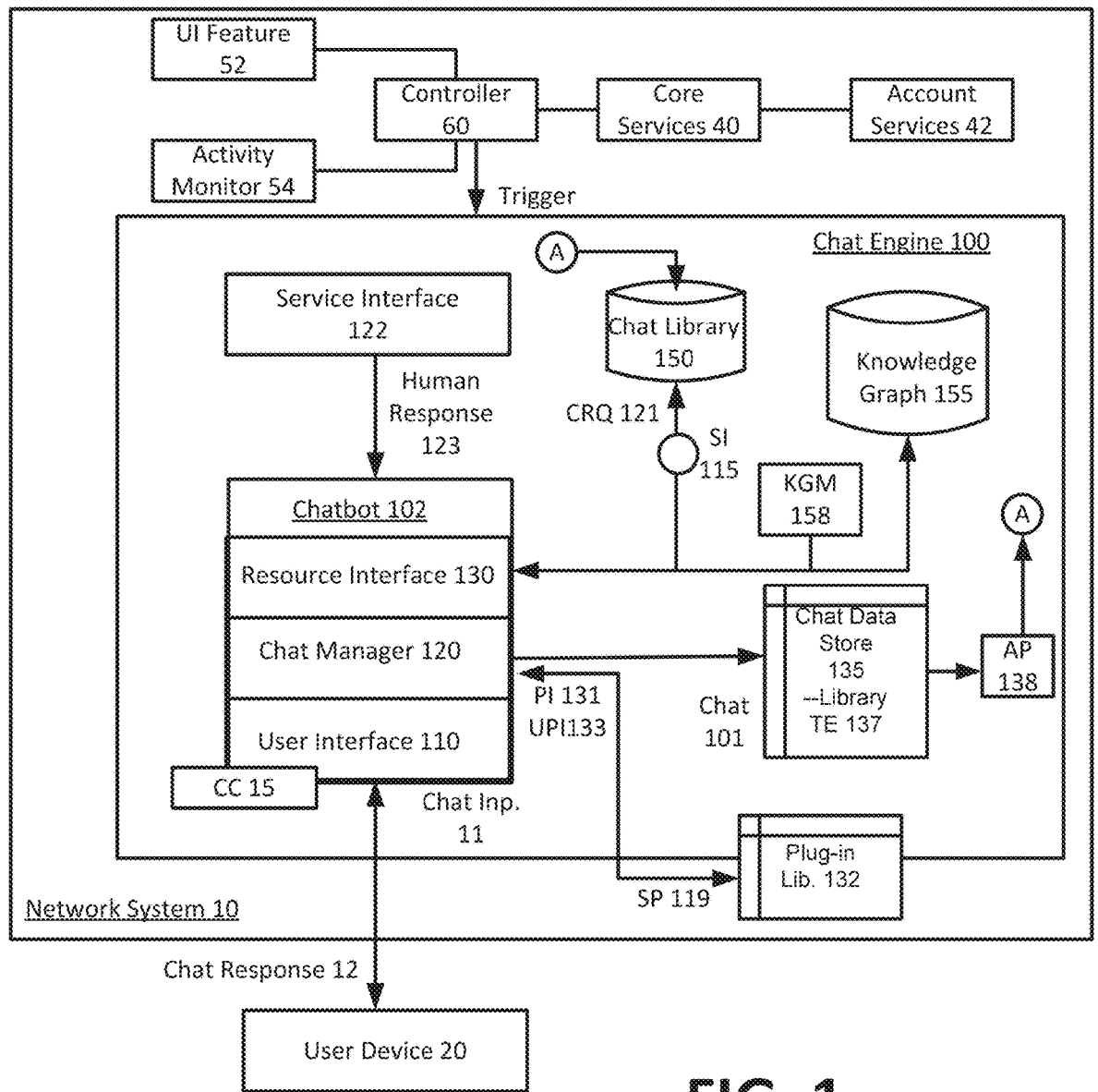
FIG. 1 illustrates a network system for providing intelligent machine-generated or assisted information to users through a computer-implemented chat interface.

Examples provide for a computer system for interacting with humans. In particular, a computer system is provided to enable autonomous chats with humans, for purpose of answering questions or performing tasks.

According to some examples, the computer system initiates a chat upon receiving a chat input from a user. The computer system records a chat state for the chat. When the chat is at the chat state, the computer system can operate to determine a search criterion from the chat input. The computer can then select a chat response from a chat library based at least in part on the chat state and the search criterion. The chat response can be communicated to the user.

In some examples, the computer implements an active process (e.g., chatbot) to perform processes of maintaining the chat state and for selecting the resource to use for the chat response. The resources can include humans, as well as programmatic resources, such as a chat library or knowledge graph. When responding to chat input, the chatbot can provide information, identify information sources, and/or ask questions for the user to answer to progressively advance the query from the user.

In some examples, such as when humans provide answers, the chatbot can record information such as the chat input that generated the specific response, the chat state when the response was received, and other information (e.g., contextual information). The information can be recorded (e.g., with a chat library) for use in other chats.

In contrast to conventional search systems, some examples are described that provide for a chat engine or system which enables searching for information when the initial input is not a well-qualified or fully developed search query or criteria. Rather, as described with various examples, the initial input received through the chat engine may have no immediate relationship to a search input, or the initial input may be ambiguous as to the search input. Examples provide for a chat engine which can efficiently determine a desired outcome for such inputs using a variety of resources and processes, including prior chats and events amongst other users.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAS), laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 illustrates a network system for providing intelligent machine-generated or assisted information to users through a computer-implemented chat interface. By way of example, the network system 10 can be implemented as part of a website or network service, to enable various classes of consumers and/or enterprise users to receive rapid and context specific assistance to queries. Accordingly, in some examples, the network system 10 can be provided as a module running on a server that interacts with client computers who access the service from, for example, a website, or through a network enabled application. Still further, some examples enable interaction with the network system 10 through a variety of communication mediums, as described in greater detail below. The network system 10 provides a computer-implemented chat interface that uses programmatic resources to respond to user queries with additional queries and/or information to answer the user query. While chats can be advanced with service operators who selectively receive and field chat queries, examples provide for the network system 10 to accumulate and refine knowledge and intelligence for use with programmatic resources that fully automate the network system's interaction with a user during a chat. The network system 10 can become increasingly intelligent over time with greater interaction with a population of users. In this way, the network system 10 can draw on larger knowledge resources, in order to better refine the chat process and enable more relevant responses to chat input queries to be provided to users through an interface that can simulate a chat conversation with a human. Over time, the network system 10 can operate a greater number of fully autonomous chats amongst a population of users, to handle increasingly more diverse and complex issues raised through chat input queries of individual users.

In FIG. 1, the network system 10 includes a set of core services 40 (such as a user account service 42), a controller 60, and a chat engine 100. The chat engine 100 can be triggered to initiate chats (or individual sessions with users) in response to events generated by functionality such as a website feature or monitor. In some examples, the controller 60 can detect a trigger signaled through a user interface feature 52 or activity monitor 54, and the trigger signal can be used to initiate the chat engine 100 for a given user. For example, chat engine 100 can be linked to a user via a communication channel between a server of network system 10 and the user's computing device. When triggered, the chat engine 100 can provide functionality for enabling chats between the network system 10 and individual users. In some implementations, the chat engine 100 can be provided as an integral part of the network system 10. In variations, the chat engine 100 can be provided as a separate network service that can be used with services of the network system 10. In other examples, the chat engine 100 can be an independent service that is available to users over a network.

In an example of FIG. 1, chat engine 100 includes a chatbot 102, a service interface 122, and one more resource libraries 150. The chat engine 100 operates to generate the chatbot 102 for individual sessions with users who are linked to communicate with the chat engine 100. The chat engine 100 can generate multiple instances of the chatbot 102 to handle chat input queries from multiple users at one time. Each chatbot 102 can be implemented as a process, or combination of processes that is initiated by the chat engine 100 in response to, for example, a chat input 11 from a user. Among other functionality described with various examples, the chatbot 102 can receive user input, and also generate output in the form of content (e.g., user and context specific, most relevant to a user question) that progressively and iteratively provides the user with highly relevant information to an initial user query.

In an example of FIG. 1, the chatbot 102 includes a chat user interface 110, a chat manager 120, and a resource interface 130. In some examples, one or more components of the chatbot 102 can be implemented at least partially using logic that is downloaded onto the end user device (e.g., webpage downloaded on user device). Thus, for example, the chat engine 100 can initiate the chatbot 102 for the user by triggering a script on the user device, which then connects to server-side programmatic components of the chatbot 102.

The chat engine 100 can initiate multiple instances of chatbot 102 in order to accommodate multiple users or entities requesting access to the chat engine 100 from different devices. The chat engine 100 can initiate the chatbot 102 in response to events such as a web page download, application launch, or program feature selection (e.g., through application). In some variations, the chat engine 100 can enable type specific communication connectors 15 to receive chat queries through messaging protocols, such as SMS, IM or email. In one implementation, some or all of the processes of the chatbot 102 are local on a user device 20 when the chatbot 102 is active for a user. In variations, some or all of the processes of the chatbot 102 are resident on a network service or terminal. Still further, variations provide that alternative forms of the chatbot 102 can be run for maintaining chats in alternative communication mediums or for other designations.

When a user submits a question, a chat 101 is initiated. At an initial instance, the chat 101 may be in the form of a user question or query ("chat input 11"). Over time, the chat 101 encapsulates a single conversation happening between a user and the chatbot 102, via a network communication channel. The initial query for the chat 101 can be provided by a user through interaction with the user interface 110. The chat manager 120 can associate the chat input 11 with a state and identifier, and the identifier can be specific to a user or session. The chat manager 120 can store information about the chat in a chat data store 135. In an example of FIG. 1, the chat data store 135 represents memory (e.g., cache) which the chat manager 120 uses to maintain a record of a given chat, and/or a collection of chats with a given entity. The record maintained by chat data store 135 can include a chat identifier, a chat history (e.g., chat input 11, chat responses 12), a current state of the chat, a state of the chat when prior events occurred (e.g., when chat input 11 were received). The state of the chat indicates a progression of the chat from the initial state to an ultimate resolution. The history of the chat can include information that provides context for the chat. The context can include information that is local and/or global. Local context is confined to a single conversation, while global contacts can exchange between conversations of a particular user.

In some variations, the chatbot 102 can include functionality to trigger additional processes to provide a chat response 12 to the chat input 11. For example, the chatbot 102 can trigger one or more plug-ins of the chat engine 100, to perform processes that are specific for a user or chat 101. The plug-ins refer to functionality, which can be integrated or called by the chat manager 120 based on, selection parameters 119. The selection parameters 119 may be parsed, or inferred from the chat input 11 by the chat manager 120. In some examples, the chat manager 120 selects individual plug-ins 131 to use from the plug-in library 132 for a given chat session based on one or more of the determined selection parameters 119.

Among other benefits, the system 10 enables a programmatic chat query for users, to enable individual users to receive information for a complex request. In contrast to searching, a chat input 11 enables more complex information to be indirectly requested (e.g., when a user does know what question to ask, what words to use, what the problem is, etc.) and exchanged with the user through a progressive process in which a user is guided to specify more information about a query. Examples provide that over time, the chat engine 100 generates more intelligent chatbots 102 which can reduce the length of time needed for the user to progress to a complete query and/or receive a satisfactory response.

The chatbot 102 can handle a chat input 11 by providing a chat response 12, which can include at least one of (1) a question for the user to answer, and/or (2) information determined in response to the chat input 11. The chat 101 can include a history of the chat input 11 from the user, and a chat response 12 to each of the chat input 11. The chat manager 120 updates the record for the chat 101 in the chat data store 135 in response to events of chat 101. Specifically, the chat manager 120 can update the record for the chat 101 to record events that correspond to chat input 11 and chat responses 12. The chat record can reflect current and past states of the chat 101, including states associated with past events (chat input 11 or chat responses 12).

In some examples, the chat manager 120 parses chat input 11 of the user for key words or phrases. The chat manager 120 can also perform textual pruning or normalization, as well as determining context for individual chat input 11. The chat manager 120 can store the determined information with the chat data store 135. The context can identify whether the question input is a new chat or a continuation of a prior chat, or a follow on to a prior chat. The chat manager 120 can perform operations such as text normalization, contextual search, etc. in order to determine a content (e.g., follow on question, content, link to source material) for the chat response 12. Based on context and other information, the chatbot 102 can make an initial determination of whether a suitable response (e.g., information or follow on question) is determinable given information and resources available to the chatbot 102.

In some examples, the chatbot 102 can use resource interface 130 to interface with selected sources that include resources (e.g., information, chat histories) for determining a response to a given chat input 11. In some examples, the resources include (1) manual servicers (human operators), and (2) a question library. The chat manager 120 can, for example, determine that there is not enough information for responding to the chat input 11, at which point chat manager 120 can select to forward the chat input 11 to a servicer interface 122. The servicer interface 122 permits human response 123 to the chat input 11. The chat manager 120 can record the chat input 11, as well as the human response 123, for use with a local and/or global chat library 150. The chat manager 120 can also update information about the ongoing chat 101 by changing the state of the chat 101 and/or recording the response 12 communicated to the user.

In some examples, an archival process 138 may periodically, or in response to certain events (e.g., after each chat response 12 or change in chat state), store information about a given chat session (e.g., recent chat input 11, chat response 12, chat state, etc.) with the chat library 150. In this way, the information determined from the chat session can be used to grow the chat library 150 for future use.

In some examples, the chat manager 120 uses chat input 11 and/or contextual information from the chat data store 135 to generate a chat response query 121. The resource interface 130 can direct the chat response query 121 to, for example, a search interface 115 for a chat library 150. The chat library 150 can include chat input 11 and/or chat responses 12 generated specifically for the user.

In some examples, the chat library 150 includes records of events from past chat sessions between individual users and a corresponding instance of the chatbot 102. In some examples, a search component 128 can generate a set of search criteria 129 based on the chat response 121. The search component 128 can search the chat library 150, to identify prior chat sessions and events generated from prior chat sessions, including chat inputs 11 and/or chat responses 12, that satisfy the search criteria 129 (e.g., chat inputs 11 or chat responses 12 which match a term or expression of criteria 129). In some implementations, the chat library 150 may be searched for events generated from past chat sessions of the same user. In variations, the chat library 150 can be used to search for events generated from past chat sessions of other users. Once a record of a prior chat session is identified, the record manager 120 can determine, for example, the response 12, or the plug-in to utilize to progress the chat for a given chat input.

In some examples, the chat manager 120 can maintain the record for the chat 101 to reflect the chat as having state and corresponding events, where the state identifies a node of the conversation and the events (chat inputs or responses) connect the nodes. An event is static when the event is a chat response 12 that is based on the chat input 11, or information provided in connection with the chat input 11 (e.g., contextual information). An event is dynamic when the chat response 12 requires the use of a resource (e.g., plug-in) that is external to the chatbot 102.

According to some examples, the chat manager 120 processes the chat input 11 to detect triggers for implementing additional processes for specific tasks or objectives. For example, the chat manager 120 can maintain a dictionary of phrases, words or other inputs which are associated with specific processes or outcomes. In one implementation, the chat engine 100 can maintain or access a plug-in library 132 to initiate a plug-in 131 for performing a specific process. Each plug-in 131 of the plug-in library 132 may include logic for implementing a workflow, or series of steps, for determining an outcome (e.g., a result), based on a process that is triggered by chat input 11. Depending on implementation, the plug-in 131 may have varying levels of complexity. By way of example, some plug-ins 131 maybe determinative, meaning the steps for achieving the respective outcome are predetermined, while other plug-ins 131 may be non-determinative, meaning some steps for achieving the outcome of the plug-in are conditional, or based on conditions generated by performance of a prior step or condition. The plug-in 131 can be triggered at varying states (e.g., place in a conversation) of a given chat session. In an example provided below, the user's question is specific and related to the user's account.

User: Why isn't my card importing?

The chat manager 120 can detect a trigger for initiating a plug-in to access a user's account based on certain key words or key word combinations. In the example provided, for example, a combination of terms such as "my card" or "my" can initiate a plug-in to access information from the user's account (e.g., via the account services 42 of the network system). In one implementation, the chat manager 120 can record the state information with the chat data store 135. The chat data store 135 may also include a library of trigger events 137 for initiating additional processes implemented through functionality such as provided by the plug-in. Thus, the chat manager 120 can use local memory to detect "my card" as a trigger event, and then use the resource interface 130 to initiate a specific plug-in 131 from service interface 122. Thus, in some examples, the chat manager 120 detects that the chat input 11 pertains to a particular topic, such as a resource associated with the user, and then automatically initiates a process that is specific to the resource or topic.

Still further, the chat manager 120 can implement a process to determine how to interpret the chat input 11 for triggering a plug-in. The chat manager 120 can, for example, seek to match a word pattern of the chat input 11 with a plug-in record (e.g., metadata, descriptors associated with individual plug-ins of the plug-in library 132) with a same state, or alternatively, with a plug-in record of any state. The plug-in record can specify parameters that are to be completed with execution of the plug-in, such as an action that is to be performed by the plug-in 131, an outcome for performing the action, and a message for the response 12. An example of the implementation for a trigger event is provided by:

```
state: 1 (IDLE)
pattern: Why isn't (?<cardName>.*) importing?
plugin: CardTools
pluginParams:
    action: diagnose
    cardFilter: broken
    noCardFoundMessage: "I'm not sure what you mean; all cards look like they're importing fine to me."
```

In the example provided, the word or phrase that detects a specific plug-in 131 corresponds to, for example, the value of the variable with the word pattern (shown as <cardname>), which can correspond to a name a user associated with a card payment instrument. The trigger event can occur at the first or one of the subsequent chat input 11. The phrase or wording pattern which triggers a particular plug-in can vary, and when recorded from different users, different word patterns can be associated with the same plug-in.

In some variations, the chat manager 120 can determine whether any plug-ins of the plug-in library 132 match criterion extracted from the chat input 11 (match word phrase and state), and if no plug-ins are identified, the chat manager 120 can create a plug-in object. In variations, the chat engine 100 can initiate a universal or multi-function plug-in 133 that includes a common set of code for use in performing any one of multiple possible functions. For example, universal plug-in 133 may include one or more workflows, each of which provide a service or function that can be used by other workflows, plug-ins or programmatic components, where each workflow determines a specific type of account and/or identifier (e.g., account number or service with third-party service) that is being referenced by the chat input 11. To further the example, the chat manager 120 can implement the universal plug-in 133 by analyzing the chat input 11 and event record to determine, for example, specific parameters 119 such as what financial instrument card is being referenced in the chat input 11, and what action is to be taken on the card. The chat manager 120 can also implement the universal plug-in 133 by parsing the chat input 11 for alternative identifiers (e.g., short names of financial institutions) or other known indicators, including profile information about a user (e.g., list of known credit cards the user has) for an account asset or resource which the universal plug-in object can process, such as a name or other identifier of a financial instrument which the user has linked to his or her account or profile with the core service 60 or network system 10.

As an addition or variation, the chatbot 102 can process the chat input 11 using various rules, logic or learned processes to determine identifiers. For example, the chat manager 120 can use the context of the chat input 11 to determine the domain for what the chat input 11 may pertain to. The chatbot 102 can also identify inferences (e.g., interpret "my card" as "card that I own"). Many situations may result in an ambiguous outcome for chatbot 102 with regards to the intent of the chat input 11, such as when multiple possible outcomes exist based on a preliminary determination of the chat manager 120. The chat manager 120 can implement, for example, a set of rules for determining the outcome that is most likely the intent of the user. For example, the chat input 11 "my card is broken" may be ambiguous when the user is associated with multiple financial instrument cards. In response to the chat input 11 "my card is broken," the chat manager 120 can initiate a plug-in to check individual cards of the user, and if one of the cards is identified as being unusable, the particular card is identified in the chat response 12. Once the particular card is identified, the chat manager 120 can update the chat 101 in progress, including updating the chat record to reflect the updated information and parameters (e.g., card name, word pattern for triggering plug-in process, etc.). The chat manager 120 can use the parameters to perform the designated action for the plug-in (e.g., attempt to access financial card, make diagnosis) and to generate and communicate the message indicating a result of the action performed (e.g., "your XYZ card has stopped working because the password for accessing the account has changed.").

To further the example, the chat input 11 may specify, after determining the prior card was broken as a result of the password change, the following:

User: Please refresh my card again

The chat manager 120 may receive the chat input 11 and match the wording pattern of the chat input.

```
state: 1 (IDLE)
pattern: Please refresh (?<cardName>.*) (again)?
plug in: CardTools
pluginParms:
    action: refresh
    cardFilter: broken
    noCardFoundMessage: "Which card do you want to refresh?"
    noCardFoundToStateID: 3
```

The examples illustrate logic which can be implemented by the chatbot 102 to determine the follow on chat input 11 for chat 101. The chat manager 120 may initiate the universal plug-in 133 again, but unlike the determinations of the previous state, in this state, the parameters of the universal plug-in 133 may already be determined. For example, the "cardID" may already be specified in the conversation context, meaning the specific card for refresh is known. If the inputs required for the universal plug-in result in an unknown outcome (e.g., no broken cards, card of user not known), then the chatbot 102 places the chat 101 in a state where a message of the chat reply 12 requests clarification of which card to refresh. An example of the record of the chat input 11 can correspond to:

```
state: 3
pattern: (?<cardName>.*)
plugin: CardTools
pluginParams:
    action: refresh
    noCardFoundToStateID: 0 // escalate to an agent
```

Thus, the chatbot 102 may escalate to a servicer via service interface 122 rather than attempt to determine the correct outcome.

Among other technical effects, an example of FIG. 1 enables alternative phrasings for common objectives to be associated with a common process or plug-in. For example, users of a network service may use alternative words or semantic structure, but the functionality required to provide a complete response to each user may be the same. When the chatbot 102 is unable to match the word pattern of a given chat input 11, the chat manager 120 can trigger human intervention via service interface 122 to determine a complete or final chat response 12. Once the chatbot 102 receives the response 12 from service interface 122, the chat manager 120 can update the record event for the chat 101, so that the chat state, the word pattern, the action and other parameters resulting from implementation of the particular plug-in are recorded. The information of the record can then be stored and made part of a search library for other chat inputs 101 from the same or other 102. In this way, the chat engine 100 can operate to generate chatbot 102 for individual users or sessions which are progressively more intelligent. With chatbot 102, the chat manager 120 can continuously expand its interpretative ability for understanding chat input 11 for a population of users.

In some examples, the user interface 110 can include or access one or more connectors 15 for enabling communications using text-based mediums, like SMS, email, Intercom, Slack, IRC, or other standard text chat interfaces which are typical for communications amongst humans over a network. In some variations, the user interface 110 can include programmatic voice interaction, where vocal human input can be recognized as chat input 11, and chat responses 12 can be output as voice synthesis. The interaction between user and chatbot 102 can be conducted through, for example, a telephone, microphone/speaker and/or through use of a mobile app.

Still further, in some variations, the chatbot 102 can be triggered to initiate a session with the user. For example, the chatbot 102 can call the user to ask a series of questions. The answers from the user can be converted to text and processed as described.

Additionally, variations provide that the chatbot 102 can interact with "Interactive Voice Response" (IVR) systems by recognizing the voice of the recording, and then generating a required audio output, such as a corresponding DTMF sound to simulate pressing a number on a dialpad, or an utterance that speaks the number. In this way, the chatbot 102 can be triggered to navigate through a customer support tree of a third-party to get to a desired target (e.g., to a human operator). For example, the chatbot 102 can navigate through the customer support tree, then contact the user when a human operator of the third-party is reached. As another example, the chatbot 102 can navigate through the customer support tree to reach the location where a card can be reported as being stolen, at which time the chatbot 102 may connect the user, or alternatively, report a card as lost or stolen.

Additionally, the functionality described with various examples can be extended to enable the chatbot 102 to autonomously interact with the IVR system to provide information (e.g., credit card number for lost card, mailing address) on behalf of the user. The chatbot 102 may provide such input as part of its interaction with either automated or human-operated aspects of an IVR system, on behalf of the chatbot's user.

As an addition alternative, the user interface 110 of the chatbot 102 can augment the text and voice chat with graphical capabilities and functionality, such as opened dialogs, and/or displayed lists and content. The graphical capabilities and functionality can be based on the history of the chat 101 and the corresponding record event. In some variations, the graphics which accompany the chat 101 can provide another interface for the user to provide input for the chatbot 102. By way of analogy, the user interface 110 can generate graphical content that simulates the use of, for example, the whiteboard in real-time, and the user can interact with the whiteboard. In such implementations, updates to the graphical content can reflect results of events which update the chat state. The user interface 110 can, for example, prompt the user to make a choice or enter input through the graphical content. The chatbot 102 can update the content of the user interface 110, and erase and redraw the content as needed or after a given chat response 12. In this way, the chatbot 102 can create a multi-media conversational experience (interspersed with graphics, video, interact elements, sound, etc.) that goes beyond what could be communicated as between humans, in terms of results achieved through actions or information communicated.

In some variations, the chatbot 102 can include a programmatic hardware interface to use equipment and hardware resources to detect user reaction (e.g., movement of limbs, eyes, facial muscles, fingers etc.) through image and/or presence detection (e.g., user movement). As an addition or variation, the chatbot 102 can include image processing resources to process visual feeds in order to perceive what the user is viewing. The chatbot 102 can thus generate programmatic responses to video input that is also being viewed by the user. The user can, for example, motion or otherwise select an object of interest from the video, and the action can be detected by the chatbot 102. In a variation, the chatbot 102 can guide the user action to change or alter the video feed. For example, the user may be instructed to perform specific tasks based on the content of the video feed.

In some variations, the chatbot 102 can include a programmatic hardware interface to interface with sensors that monitor or observe a disabled user. Through the sensor(s), the chatbot 102 can detect user motion focused on communication movements of a disabled person. For example, the chatbot 102 can detect slight movements, such as eye movements or finger motions.

According to some variations, the user interface 110 can include logic for preprocessing user input. In particular, the user interface 110 can include logic to preprocess user input in order to generate semantically equivalent queries and inputs from phrases that otherwise differ by syntax. Such preprocessing can be used to normalize input from users. Additionally, the user interface 110 can include logic to augment the input with additional information that is not explicitly provided by the user, but can be inferred from external sources or background information detected via the user interface 110.

In some variations, the user interface 110 implements preprocessing to normalize or conform the chat input 11. In some examples, the chatbot 102 can implement any one of numerous algorithms to detect and replace typos. Additionally, examples recognize that tendencies for specific typos can vary based on the medium of communication. For example, when the user is interacting on a mobile keyboard, "typos" resulting from accidental keystrokes are common. When some unrecognized word is found in the input, the logic of user interface 110 can be replaced through a variety of algorithms (such as Levenshtein distance) with the correct word. Additionally, the chatbot 102 can detect the medium of the input (e.g., as contextual input) and correct typos based on known typo habits of that medium (e.g., the layout of the keyboard affects the typos created). Such medium and typo correction can yield normalized chat input 11 better than human capabilities.

In other variations, the user interface 110 can include grammar normalization logic, which can specify rules, for example, to normalize variations of a statement so that the chat input 11 is communicated in accordance with a normalized grammar. For example, rather than learning how to answer "Where's the office" and "Where is the office" as two different questions with the same answer, the logic of the user interface 110 can replace "Where's" with "Where is" in the preprocessing stage, so that there is only one question for the chatbot 102 to answer. In some variations, the logic of the user interface 110 can implement sentence diagramming to parse out the underlying sentence structure, and then match rules based on the structure rather than the exact text itself.

The user interface 110 can also include logic for slang correction. Often times different users will use different words to describe the same concept. With knowledge of regional dialect or even just common slang, some words can be replaced with their more common alternatives. For example, "soda" is more common than "pop" for describing carbonated beverages overall, but the preference is strongly influenced by region.

The chatbot 102 may also use slang correction or other speech normalization logic to conform the chatbot's output to a style or format that is not the default or standard, but one that is specific to information known or inferred about the user submitting the chat input 11. For example, in some variations, the chatbot 102 can generate messages (e.g., questions) for the user based on information known about the user, such as geographical region. To further the example, the chatbot 102 would know to ask users in California "What kind of coke do you want?" given that it is used generally there to refer to "soda", while a user in Colorado asking for a "a coke" likely means "Coca-Cola". With access to statistical data that no human could remember, the chatbot 102 could appear more "worldly" than any human.

The user interface 110 can also include logic to implement translation from a native language to a language the chatbot 102 already recognizes—or even into an internal language that is unique to the chatbot 102. For example, the chatbot 102 can communicate with an external translation engine in order to translate the chat input 11 and/or the chat response 12. With access to translation resources, the chatbot 102 could be more multilingual than humans.

The user interface 110 can also include, or otherwise utilize resources for determining the location of the user from characteristics of the network communication with the user. Location information can be determined explicitly from chats, such as via a GPS-enabled chat interface, or implicitly via IP-geolocation of the incoming communication stream. Such resources can enable the chatbot 102 to have real-time knowledge of the user's location, and this information can be used to generate the response for the user.

In some variations, the chatbot 102 can be programmed to access external database resources. In accessing external database resources, the chatbot 102 may infer, or otherwise determine information that is specific to the user, in order to more competently or efficiently implement the actions which are required from the user intent. Examples recognize that there are external sources of knowledge about the user that could be queried in real-time to help provide context for the input. For example, a public calendar published by the user (or private calendar shared with the chatbot 102) might indicate what the user is doing, which could provide crucial context to chat input such as "Where am I supposed to be?"—questions that come up in a hurry when the user doesn't have time to provide a more detailed question. Similarly, a user might specify chat input of "Where is something good to eat?" and the chatbot 102 could use external databases and resources to analyze buying habits of food (and compare to nearby restaurants) and to provide an answer that a human operator could only achieve through extensive questioning.

The resources of the chatbot 102 can enable background analysis. For example, a significant amount of context carried along with the communication that isn't explicitly generated by the user. For example, a microphone can pick up the sounds of the environment around the user, and this sound could be analyzed by resources available to the chatbot 102, in order to automatically (e.g., without user input) determine the context of a chat input query. Machine-learning, implemented by the chat engine 100, can operate to not just understand if the user is indoors in a quiet office environment or standing on a noisy subway terminal, but also to hear the voices of the people nearby. Through interaction with the machine-learning resource, the chatbot 102 can identify what language is being spoken to infer location, or even learn and map out the "audio fingerprint" of the background to determine location, likely activity, mode of transportation, weather, or other context accompanying the user when the chat input 11 is submitted. The context can be used to determine the chat response 12.

According to some examples, multiple types of preprocessing such as described above can work in concert. Also, given that preprocessing is often ambiguous—there are many possible ways to preprocess the same input—many attempts of preprocessing might be tried sequentially (or in parallel). These various preprocessed inputs could be "scored" a variety of ways, such as by seeing which are the most grammatically accurate, which correspond to the most common input seen from other users, etc.

Still further, some variations provide for the user interface 110 to also include functionality for rendering or otherwise presenting responses from the chatbot 102 in a manner that is more humanlike. According to one aspect, the user interface 110 includes a language library of terms and phrases for various dialects, including slang or age-related conversational terms. The chatbot 102 can include intelligence to detect the type of library which is most relevant to the user. The chatbot 102 can include intelligence to detect the language library which is most relevant to the user. For example, the chatbot 102 can include logic to match terms and phrases of the chat input 11 with a particular language identifier, from which the language library can be selected. In variations, the chatbot 102 can access or determine contextual information about the user. As examples, the contextual information can include geographic information about the user or source of the chat input 11, as well as demographic information (e.g., age) of the user. The sources of the contextual information can include, for example, the IP address of the user, as well as demographic or profile information about the user.

The chatbot 102 can also modify or otherwise configure the chat responses 12 provided through the user interface 110 to accommodate specific facets for the user. The user interface 110 can include plug-ins, or interfaces to third-party services for enabling such functionality. For example, the chatbot 102 can include a translation plug-in or service that converts a chat response 12 from one language to a native language of the user.

As an additional variation, the chatbot 102 can include logic to detect the personality trait of the user, such as based on the propensity of the type of words the user uses (e.g., energetic, somber, technical etc.). In implementation, the chatbot 102 can access libraries of terms and phrases in order to configure the output. For example, for a user that uses energetic expressions, the chat response 12 can include "great question! Would you happen to know the version of QuickBooks?" For another user, the chat response 12 can simply state "please provide a version of QuickBooks."

As an additional variation, the chatbot 102 can time shift a chat response 12 so that the user is more likely to view the response and/or be engaged. For example, the chatbot 102 can detect a time zone of the user, or access the profile to determine when the user is most likely to be online or most available to view information from a particular network service from which the chat response is being requested. The chatbot 102 can then provide the response to the user in a timeframe where the user is likely to view it.

According to some embodiments, the chat engine 100 can implement chatbots 102 in connection with a knowledge graph 155 of information accumulated from a variety of sources, such as individual chats 101 conducted with users in a given population. The various chats 101 can provide the chat engine 100 with access to knowledge of third-parties, as well as to information contained in a greater number of third-party databases. In some examples, a knowledge graph 155 can be built and refined by processing the interactions of individuals. The processing can result in a structured data set, where facts, information items, information resources, metadata and other information can be interrelated. The knowledge graph 155 can be built over time, and can be stored internally, accessed via external database, or directly learned through scanning of source materials in real-time. With access to knowledge graph 155, the chatbot 102 can answer questions like "What is the population of the state whose capital is Sacramento?" Rather than needing to learn that answer directly via agent training, the chatbot 102 can use the knowledge graph 155 to directly understand the question and provide the corresponding answer.

While search engines typically utilize knowledge graphs of various forms, an example of FIG. 1 includes an enhanced knowledge graph 155, as the chat engine 100 can assimilate and structure information learned from chats conducted through individual chatbots 102. The chats 101 provide an inherent advantage of providing feedback, both direct and indirect, when information is exchanged as a result of an initial chat input 11. Additionally, the question and answer process which is inherent with chats 101 can provide a source of information for the knowledge graph 155. The information which can be learned from the question and answer of a given chat can be explicit (or direct) or implicit (or indirect) to the chat 101. For example, the information learned for the knowledge graph 155 can include implicit information which the user did not explicitly state when submitting the chat input 11. Likewise, service operators who provide information through service interface 122 can also provide a source of information, either through their respective responses or through interviews conducted through, for example, service interface 122 and/or a service-side version of the chatbot.

According to some variations, the knowledge graph 155 can include a portion that is private and/or specific to an entity (such as a user, or enterprise). The knowledge graph 155 can include instances which are separated from one another so as to avoid commingling or compromise of information that is private or confidential. In one example, the chat engine 100 could use the chatbot 102 to "progressively profile" an organization to learn various types of information. In such implementations, the information learned can include user-specific information (e.g., what role the user has within the organization), enterprise specific information (e.g., what accounting package is used within the enterprise) and general information (e.g., how are tax receipts treated under latest IRS rules). This information can be learned from chats 101 conducted with different users of the organization. The information can then be used to develop the private knowledge graph 155, as well as configuring third-party services which are used by the organization.

In some variations, the chat engine 100 maintains multiple segmented knowledge graphs 155 that are combined into one logically and/or physically partitioned system. The knowledge graphs 155 can also be structured and used with resources that enable an auditable security model, so as to provide a level of customization and contextual awareness that could not have a manual equivalent.

The knowledge graph 155 can also serve to provide fresh information, including information that is dynamic. When information of the knowledge graph 155 is deemed invalid (e.g., when obviated), the information may be tied back to nodes in the knowledge graph and the information can be identified and deleted.

A graph module 158 can develop the knowledge graph 155 using information gathered through individual chatbots 102. For example, information determined from chat input 11 can provide information sources, such when chats progress to a point where the chat input query includes feedback or more depth of information. The chatbot 102 can include logic to extract private or confidential information from the contents of the chat 101, and the extracted information can be used by the graph module 158 to develop and refine the knowledge graph 155. The graph module 158 can also use the private/confidential information to develop a private portion of the knowledge graph 155, while at the same time using the public portion of the chat 101 to develop the public portion of the knowledge graph 155.

Augmented Services

In some variations, a chatbot 102 can be initiated for a given user for purpose of accomplishing a task or series of tasks on behalf of the user. While various electronic assistants exist (e.g., SIRI), such conventional approaches generally require the user to operate a mobile computing device that authenticates the user, and such devices generally perform localized operations through the interfaces of the device. The chatbot 102 can provide functionality that extends beyond such conventional approaches. In particular, the chat engine 100 can initiate instances of chatbot 102 which operate remotely, or from a network service, to perform a variety of tasks on behalf of the given user. In some examples, the tasks that are performed for a given user are automated and require no specific input from the user other than an objective or goal. For example, a user can request the chatbot 102 to update the mailing information for a credit card account after the user has moved. In this example, the chatbot 102 can perform the necessary steps of changing the user's address with the credit card issuing company, without receiving additional input from the user. For example, the chatbot 102 can access the private portion of the knowledge graph 155 in order to determine the user's address, login information, password, and further implement a plug-in or process that navigates the website of a financial institution and recognizes the fields of the online interface of the financial institution, so as to insert the relevant information for the user in the appropriate field.

In order to enable the chatbot 102 to perform tasks on behalf of the user, the chat engine 100 can include functionality, either with the chatbot 102 or with other components of chat engine 100, for enabling an initiated chatbot 102 to utilize authentication information that enables tasks to be performed on behalf of the user with various third-party services and sites. The chatbot 102 can access the private portion of the knowledge graph 155 of the user to determine relevant information, such as login and password for specific sites, and/or financial institution information, personal information (e.g. on matters). In variations, the chatbot 102 can request necessary permission from the user and store the information in the knowledge graph 155, subject to conditions (e.g., for specific purpose and task, subject to deletion after use, etc.). In other variations, the chat engine 100 can provide a cookie or other programmatic process to retrieve the necessary information from the user's account or device, with the user's exquisite permission.

The chat engine 100 can include plug-ins to provide functionality for interacting with third-party services and sites. In variations, the chat engine 100 can access plug-ins for such functionality. The chat engine 100 can make the plug-ins accessible to the chatbot 102 that is initiated for a given user, in order enable the third-party website or service interaction.

According some aspects, plug-ins for enabling specific interactions to be performed with third-party services or websites can be published online. The plug-ins can also be published by third parties, for use with a chatbot as implemented by examples such as described with FIG. 1.

As an additional variation, micro formatted scripts can be developed separately from plug-ins that are used by the chatbot 102. For example, scripts can be detected in real-time by a given chatbot 102 (or plug-in initiated by the chatbot 102) in connection with the chatbot 102 performing a particular task (e.g., interacting with a particular site). The chatbot 102 can perform a task by identifying the particular script for the site or service, or alternatively for the particular task, and then loading the script in order to commerce just task, using user specific information (e.g., such as private information, or information user specified for the task auspices. In this matter, the scripts can be selectively integrated by the chatbot 102 into an operative plug-in with universal capabilities for performing tasks of a particular type, category (e.g., for a website) or class (e.g., online access of user accounts). The source of such scripts can vary, and serve different purposes and utilities with varying degrees of specificity. Still further, the chat engine 100 can include processes, integrated with or independent of chatbot 102, to perform queries of third-party services in order to enable automation of subsequent tasks using chatbots 102 that are acting on behalf of users. The chatbot 102 can perform a task by identifying the particular script for the site or service, or alternatively for the particular task, and then loading the script in order to commerce just task, using user specific information (e.g., such as private information, or information user specified for the task). In this matter, the scripts can be selectively integrated by the chatbot 102 into an operative plug-in with universal capabilities for performing tasks of a particular type, category (e.g., for a website) or class (e.g., online access of user accounts). The source of such scripts can vary, and serve different purposes and utilities with varying degrees of specificity.

In order to enable the chatbot 102 to perform tasks on behalf of the user, the chat engine 100 can include functionality, either with the chatbot 102 or with other components of chat engine 100, for enabling an initiated chatbot 102 to access and utilize authentication information for accessing the service or site where the task is to be performed. As mentioned in prior examples, the chatbot 102 can access the private graph 155 of the user to determine relevant information, such as login and password for specific sites, and/or financial institution information, or personal information. In other variations, the chatbot 102 can request necessary permission from the user, and the information can be stored in the knowledge graph 155, subject to rules regulating use of the data (e.g., information being limited for use for a specific purpose or with a particular task, deletion of data after event or passage of time, etc.). Still further, in other variations, the chat engine 100 can provide a cookie or other programmatic process to retrieve the necessary information from the user's account or device, with the user's exquisite permission.

In other examples, the chat engine 100 can include plug-ins to provide functionality for interacting with third-party services and sites. In variations, the chat engine 100 can access plug-ins for such functionality. The chat engine 100 can make the plug-ins accessible to an instance of chatbot 102 which is initiated for a given user, in order enable the third-party website or service interaction on behalf of the given user.

According some aspects, plug-ins for enabling specific interactions to be performed with third-party services or websites can be published online, by other third parties, for use with a chatbot as implemented by any of the examples described with FIG. 1.

Still further, the chat engine 100 can include processes, integrated with or independent of chatbot 102, to perform queries of third-party services in order to enable automation of subsequent tasks using chatbots 102 that are acting on behalf of users. For example, websites can publish scripts or capabilities which are enabled for chatbots 102 in connection with user accounts or other services. In this way, a user can request an action (e.g., "Please book me a flight") and the chatbot 102 can implement processes to determine which of its known sources allow it to execute that operation.

EXAMPLES

Figure 2A:
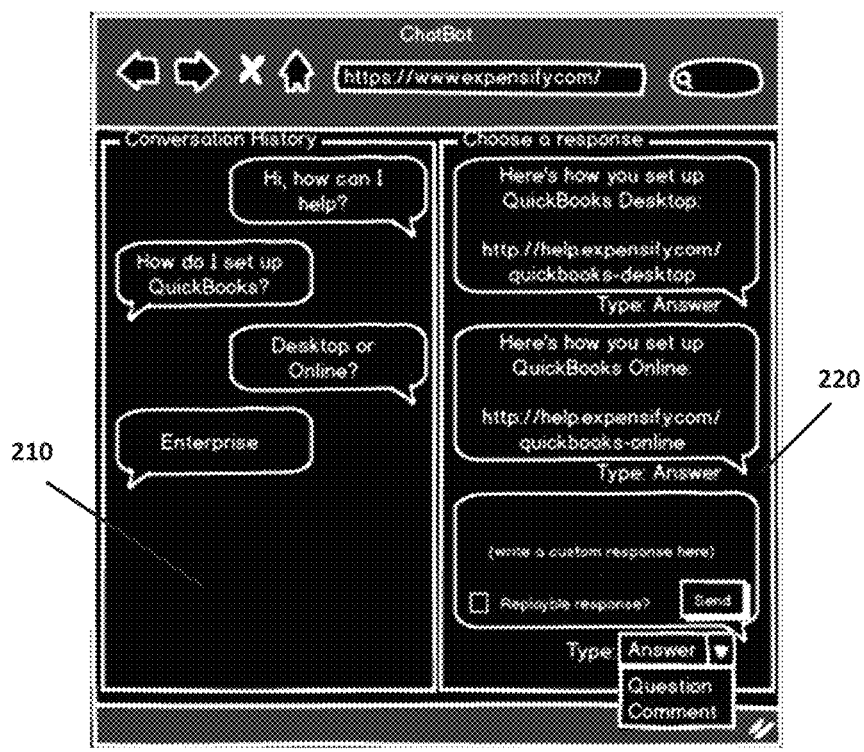
FIGS. 2A and 2B illustrate example service interfaces for use with a chatbot.
Figure 2B:
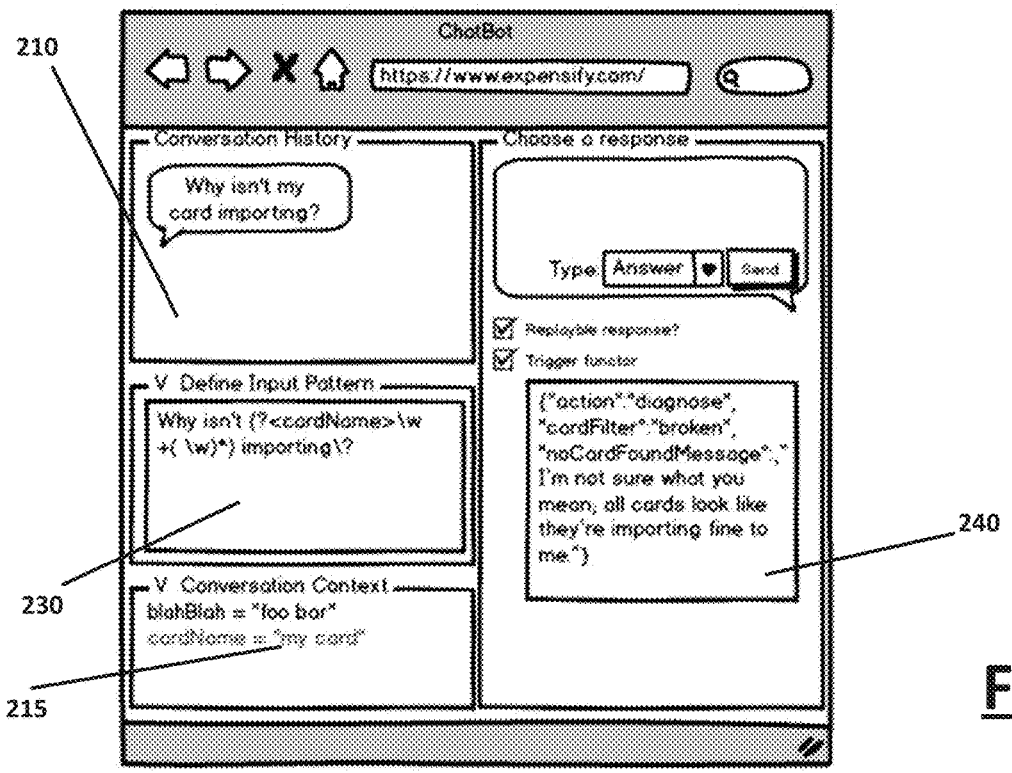

FIG. 2A and FIG. 2B illustrate examples of a servicer interface 122 for use with chatbot implementations. In FIG. 2A, a first panel 210 represents the contents of a chat 101, and a second panel 220 illustrates the development of chat responses from prior chats conducted through chat engine 100, with other users. The second panel 220 can, in some variations, be displayed to a servicer who can select an answer or type an answer. In variations, the responses 12 can be selected and provided to the user through a programmatic process (without humans). In the example provided, responses 12 can include information, questions to conform the chat input 11 to a prior chat (so answer can be selected), or a link to an information source for the input.

In FIG. 2B, additional panels 230 can render output of other processes. For example, one of the panels 230 illustrates a result of the chat manager 120 parsing the chat input 11 to extract variables 215 which indicate plug-in actions. A panel 240 can represent the portion of the service interface 122, where the human servicer can view the actions which can be performed in response to detection of the given variable. Additionally, the selection of the action by the human can be recorded and replayed automatically when other chats trigger a same state and trigger event.

Hardware Diagram

Figure 3:
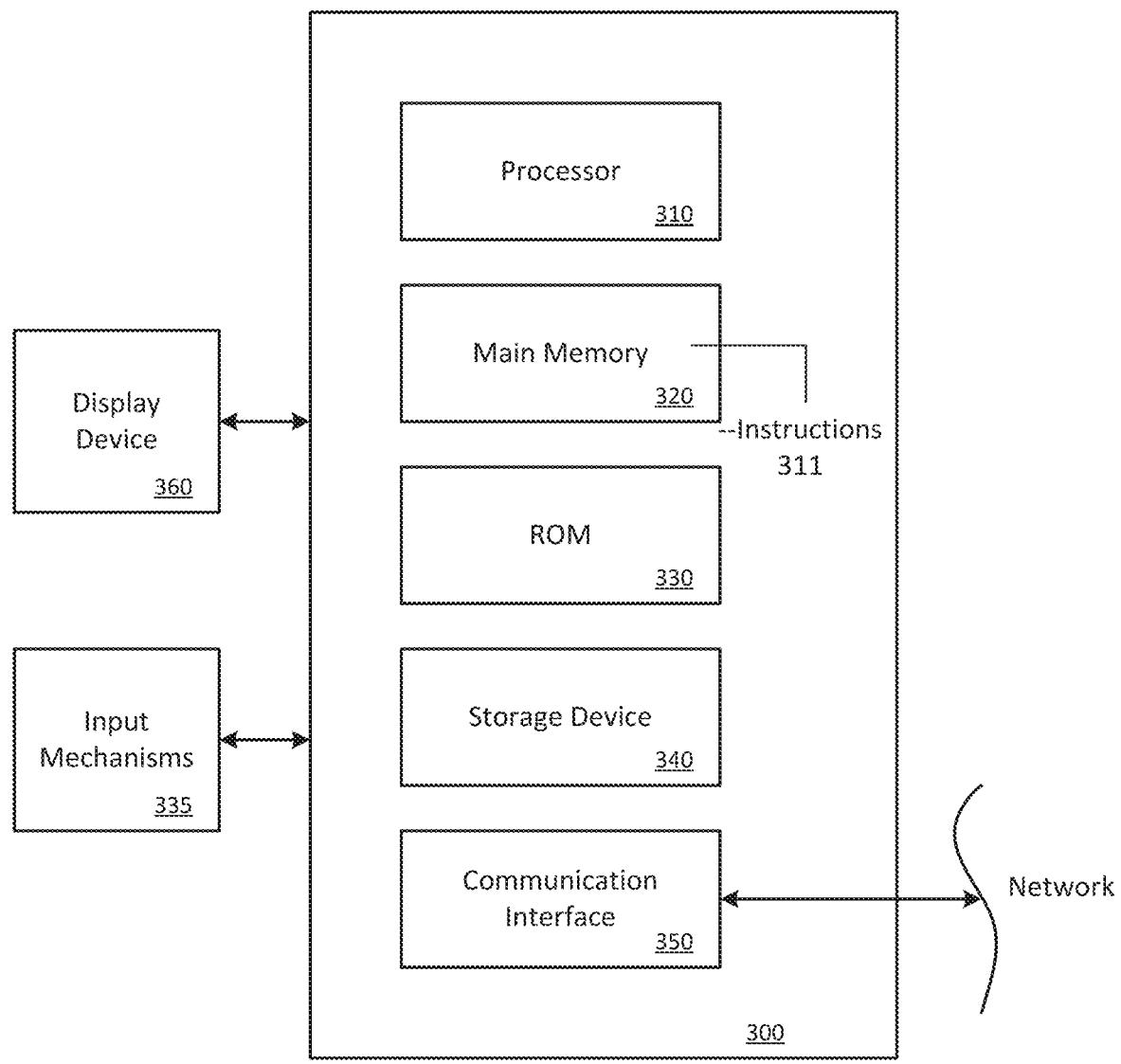
FIG. 3 is a block diagram that illustrates a computer system upon which examples described herein may be implemented.

FIG. 3 is a block diagram that illustrates a computer system upon which examples described herein may be implemented. For example, in the context of FIG. 1, the chat engine 100 may be implemented using a computer system such as described by FIG. 3.

In one implementation, a computer system 300 includes processing resources 310, a main memory 320, a read-only memory (ROM) 330, a storage device 340, and a communication interface 350. The computer system 300 includes at least one processor 310 for processing information and the main memory 320, such as a random access memory (RAM) or other dynamic storage device, for storing information and instructions to be executed by the processor 310. The main memory 320 also may be used for storing temporary variables or other intermediate information during execution of instructions to be executed by the processor 310. The computer system 300 may also include the ROM or other static storage device for storing static information and instructions for processor 310. The storage device 340, such as a magnetic disk or optical disk, is provided for storing information and instructions, such as instructions to implement chat engine 100 and/or chatbot 102.

The communication interface 350 can enable the computer system 300 to communicate with one or more networks (e.g., cellular network) through use of the network link (wireless or wireline). Using the network link, the computer system 300 can communicate with one or more computing devices, and one or more servers.

The computer system 300 can also include a display device 360, such as a cathode ray tube (CRT), an LCD monitor, or a television set, for example, for displaying graphics and information to a user. An input mechanism 330, such as a keyboard that includes alphanumeric keys and other keys, can be coupled to computer system 300 for communicating information and command selections to the processor 310. Other non-limiting, illustrative examples of input mechanisms 335 include a mouse, a trackball, touch-sensitive screen, or cursor direction keys for communicating direction information and command selections to the processor 310 and for controlling cursor movement on the display 360.

Examples described herein are related to the use of the computer system 300 for implementing the techniques described herein. According to one example, those techniques are performed by the computer system 300 in response to the processor 310 executing one or more sequences of one or more instructions 311 contained in the main memory 320. Such instructions 311 may be read into the main memory 320 from another machine-readable medium, such as the storage device 340. Execution of the sequences of instructions 311 contained in the main memory 320 causes the processor 310 to perform the process steps described herein. In alternative implementations, hard-wired circuitry may be used in place of or in combination with software instructions to implement examples described herein. Thus, the examples described are not limited to any specific combination of hardware circuitry and software. In examples provided, the instructions 311 execute to initiate and implement the chat engine 100, such as described with examples of FIG. 1, on a server or network computer system.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A computing system implementing a chat service, the computing system comprising:
   a network communication interface to communicate, over one or more networks, with computing devices of users of the chat service;
   one or more processors; and
   a memory storing a plug-in library and instructions that, when executed by the one or more processors, cause the computing system to:
      receive, over the one or more networks, a chat query from a computing device of a user;
      process the chat query using a set of rules to determine an intent associated with the chat query;
      trigger a plug-in from the plug-in library based at least in part on a set of parameters associated with the intent;
      utilize the plug-in to access one or more resources and determine a chat response for the chat query; and
      transmit, over the one or more networks, the chat response to the computing device of the user.

2. The computing system of claim 1, wherein:
   the set of parameters includes (i) an action to perform and (ii) information used to perform the action,
   the computing system automatically performs the action based on the information, and
   the chat response indicates an outcome of the action.

3. The computing system of claim 1, wherein the chat query comprises at least one of a text input from the user or a voice input from the user.

4. The computing system of claim 1, wherein the computing system processes the chat query by performing at least one of:
   matching one or more key words or phrases from the chat query to the intent; or
   determining a context associated with the chat query based on one or more prior chats with the user or one or more external database resources.

5. The computing system of claim 1, wherein the set of parameters includes a word pattern that is extracted from the chat query and matched the plug-in.

6. The computing system of claim 5, wherein the set of parameters further comprises at least one of a state of a chat with the user or the chat response.

7. The computing system of claim 1, wherein the one or more resources comprise one or more third-party resources requiring user-specific information of the user to enable access.

8. The computing system of claim 7, wherein the memory further stores a knowledge graph that includes the user-specific information of the user, and wherein the executed instructions cause the computing system to perform a lookup in the knowledge graph for the user-specific information and utilize the user-specific information to access the one or more third-party resources.

9. The computing system of claim 8, wherein the user-specific information comprises at least one of personal information of the user or one or more passwords of the user.

10. The computing system of claim 1, wherein the chat response comprises a request for additional contextual information from the user, and the executed instructions further cause the computing system to:

receive, over the one or more networks, a response to the request for the additional contextual information from the computing device of the user; and parse the response to determine the plug-in.

11. A non-transitory computer readable medium storing instructions for implementing a chat service, wherein the instructions, when executed by one or more processors of a computing system, cause the computing system to:

receive, over one or more networks, a chat query from a computing device of a user;

process the chat query using a set of rules to determine an intent associated with the chat query;

trigger a plug-in from a plug-in library based at least in part on a set of parameters associated with the intent;

utilize the plug-in to access one or more resources and determine a chat response for the chat query; and transmit, over the one or more networks, the chat response to the computing device of the user.

12. The non-transitory computer readable medium of claim 11, wherein:

the set of parameters includes an action to perform based on the chat query and information used to perform the action, the computing system automatically performs the action, and the chat response indicates that the action has been performed.

13. The non-transitory computer readable medium of claim 12, wherein the chat response includes a request for additional contextual information from the user, and the executed instructions further cause the computing system to:

receive, over the one or more networks, a response to the request from the computing device of the user; and perform an additional action based on one or more additional parameters associated with the response.

14. The non-transitory computer readable medium of claim 11, wherein the executed instructions cause the computing system to identify one or more typos in the chat query and automatically correct the one or more typos prior to processing the chat query.

15. The non-transitory computer readable medium of claim 11, wherein the chat query comprises a voice input by the user.

16. The non-transitory computer readable medium of claim 15, wherein the executed instructions cause the computing system to:

determine a context of the chat query based at least in part on one or more sounds associated with the voice input; and determine the chat response based at least in part on the context.

17. The non-transitory computer readable medium of claim 16, wherein the context comprises at least one of an environment around the user, a location of the user, a language of the voice input, additional voices of people nearby the user, a likely activity, a mode of transportation, or a weather condition.

18. The non-transitory computer readable medium of claim 11, wherein the one or more resources comprise at least one of a human operator or a chat library of prior chat sessions and events generated from the prior chat sessions.

19. The non-transitory computer readable medium of claim 11, wherein the chat query is provided in a first language that is not native to the chat service, and wherein the executed instructions cause the computing system to translate the chat query into a second language that is native to the chat service.

20. A computer-implemented method of managing a chat service, the method being performed by one or more processors and comprising:

receiving, over one or more networks, a chat query from a computing device of a user;

processing the chat query using a set of rules to determine an intent associated with the chat query;

triggering a plug-in from a plug-in library based at least in part on a set of parameters associated with the intent;

utilizing the plug-in to access one or more resources and determine a chat response for the chat query; and transmitting, over the one or more networks, the chat response to the computing device of the user.

* * * * *